United States Patent
Schroeder et al.

(10) Patent No.: US 6,457,768 B1
(45) Date of Patent: Oct. 1, 2002

(54) TWO-PIECE VEHICLE HARDTOP HAVING AN INTEGRAL STRUCTURAL HEADLINER

(75) Inventors: Del C Schroeder, Bloomfield Hills; Jeremy A Panasiewicz, Pontiac; David G Speth, Sylvan Lake; Russell C Fielding, Clarkston, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/574,634

(22) Filed: May 18, 2000

(51) Int. Cl.[7] .................................................. B60J 7/00
(52) U.S. Cl. .................. 296/214; 296/190; 296/29; 296/193
(58) Field of Search ........................... 296/901, 191, 296/210, 214

(56) References Cited

U.S. PATENT DOCUMENTS

| | | | |
|---|---|---|---|
| 3,836,192 A | * 9/1974 | Wilfert | 296/901 |
| 4,491,362 A | * 1/1985 | Kennedy | 296/193 |
| 4,568,581 A | * 2/1986 | Peoples, Jr. | 296/901 |
| 4,705,716 A | * 11/1987 | Tang | 296/901 |
| 4,837,914 A | * 6/1989 | Borum et al. | 296/901 |
| 4,950,522 A | * 8/1990 | Vogt et al. | 296/191 |
| 4,976,490 A | * 12/1990 | Gentle | 296/901 |
| 5,015,533 A | * 5/1991 | Delagi et al. | 428/549 |
| 5,172,954 A | * 12/1992 | Yamazaki et al. | 296/901 |
| 5,228,742 A | * 7/1993 | Johnson et al. | 296/191 |
| 5,538,094 A | * 7/1996 | Cobes, Jr. et al. | 296/191 |
| 5,632,673 A | 5/1997 | DeRees et al. | |
| 5,639,155 A | 6/1997 | Kowall et al. | |
| 5,660,427 A | * 8/1997 | Freeman et al. | 296/190 |
| 5,709,426 A | 1/1998 | DeRees et al. | |
| 5,733,631 A | * 3/1998 | Kelman | 296/191 |
| 5,741,045 A | 4/1998 | DeRees et al. | |
| 5,758,896 A | 6/1998 | Cruise | |
| 5,806,620 A | 9/1998 | DeRees et al. | |
| 5,816,606 A | 10/1998 | Cruise et al. | |
| 5,826,948 A | 10/1998 | Schroeder et al. | |
| 5,879,042 A | * 3/1999 | DeRees et al. | 296/29 |
| 5,899,522 A | * 5/1999 | DeRees et al. | 296/185 |
| 5,913,348 A | * 6/1999 | Horton | 15/196 |
| 5,921,568 A | 7/1999 | Cruise et al. | |
| 5,934,745 A | * 8/1999 | Moore et al. | 296/197 |
| 5,957,563 A | 9/1999 | Moore | |
| 5,964,490 A | 10/1999 | Schroeder et al. | |
| 5,966,984 A | 10/1999 | Moore et al. | |
| 6,048,022 A | * 4/2000 | Ishibashi et al. | 296/191 |
| 6,168,231 B1 | * 1/2001 | Fielding et al. | 296/191 |
| 6,179,364 B1 | * 1/2001 | Takahashi | 296/191 |
| 6,206,458 B1 | * 3/2001 | Schroeder et al. | 296/193 |
| 6,225,556 B1 | * 5/2001 | Sato | 174/36 |

FOREIGN PATENT DOCUMENTS

| | | | |
|---|---|---|---|
| JP | 0219165 | * | 11/1985 |
| JP | 0219166 | * | 11/1985 |
| JP | 0219167 | * | 11/1985 |
| JP | 0219168 | * | 11/1985 |
| JP | 0046977 | * | 2/1988 |
| JP | 0090881 | * | 4/1989 |
| JP | 0103586 | * | 4/1989 |

* cited by examiner

Primary Examiner—Kiran B. Patel
(74) Attorney, Agent, or Firm—Edwin W. Bacon, Jr.

(57) ABSTRACT

A vehicle plastic body panel such as a vehicle hardtop is formed with an integral reinforcing component including a structural fiber material molded into the body panel. The reinforcing component provides internal structural support for the use of horizontal plastic body panels such as a roof or a hood panel without the panel sagging.

4 Claims, 3 Drawing Sheets

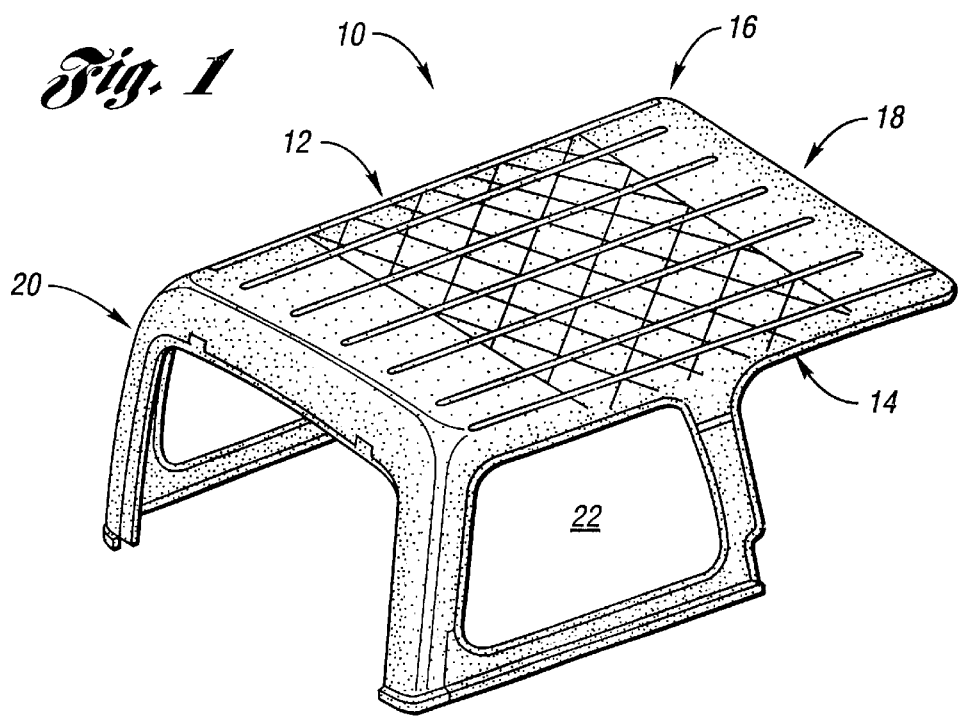
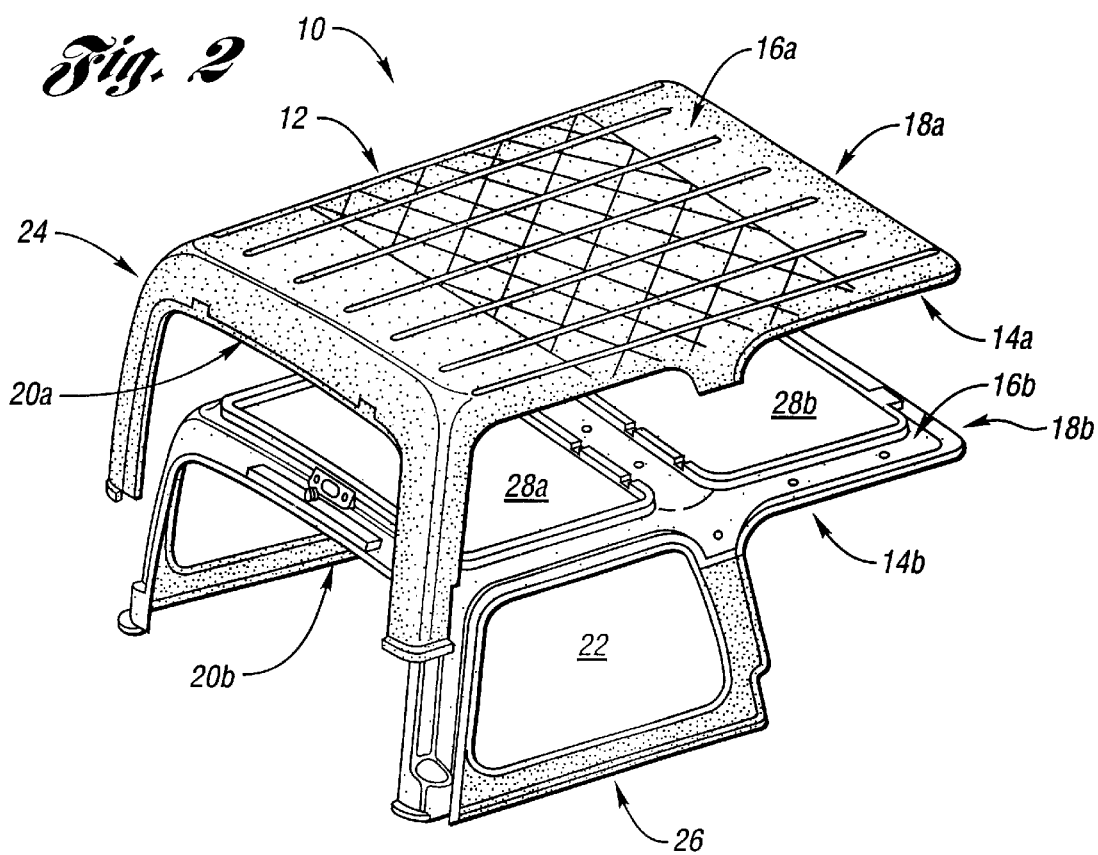

TWO-PIECE VEHICLE HARDTOP HAVING AN INTEGRAL STRUCTURAL HEADLINER

FIELD OF THE INVENTION

The present invention relates generally to a molded plastic panel, more particularly the present invention relates to a reinforced plastic panel. More specifically, but without restriction to, the particular embodiment and/or use which is shown and described for purposes of illustration the present invention relates to an injection molded plastic panel having a structurally reinforced area used as a horizontal body panel.

BACKGROUND OF THE INVENTION

The major trend in the automotive industry is to produce vehicles that are lighter than previous vehicles. This is typically performed in order to achieve the full economy benefit inherent in a lighter vehicle. Another major trend in the automotive industry is to produce vehicles that are less expensive to manufacture than its predecessors. The auto industry is then in a seemingly never-ending struggle to produce vehicles that are lighter in weight and less expensive than previous vehicles.

In order to produce vehicles which are lighter and less expensive there has been a strong movement in the automotive industry to develop vehicle body panels which have been molded from plastic. One particular means of producing plastic panels is by injection molding. Unfortunately, it is very difficult to provide injection molded plastic in a vehicle panel size sufficient for automotive application. In order to obtain large plastic molded panels it is necessary to develop molds which are large enough to produce such a panel. Once a mold has been developed it is necessary to produce a large plastic panel which not only has structural rigidity but provides an aesthetically pleasing appearance for vehicle body panels. It is typically required that a plastic molded panel needs to be painted in order to obtain an aesthetically pleasing surface. This process adds costs and is therefore undesirable. As a result, it is desirable to produce large plastic panels that are textured or have a show surface on both the interior and exterior surfaces that does not require paint, in order to be aesthetically pleasing.

More important than the aesthetically pleasing surface of the large plastic panel, is the structural rigidity that the panel maintains. This is especially important in the production of horizontal plastic panels. One major problem with the production of horizontal plastic panels by injection molding is the tendency of the relatively flat plastic panel surface to sag throughout the plastic panel. In order to overcome this problem, it is necessary to develop a reinforced plastic panel which may provide all the tensile load bearing capacity needed to support a horizontal surface.

The development of such technology will allow injection molded plastic panels to be developed for horizontal surfaces, thereby providing a cost efficient and more effective plastic panel which may be used in various automobile applications. Furthermore, the development of a reinforced plastic panel allows for increased flexibility in the application and use of injection molded panels.

SUMMARY OF THE INVENTION

Accordingly, it is the principle objective of the present invention to provide a vehicle panel system which is structurally reinforced. It is another objective of the present invention to provide an injection molded plastic panel which incorporates structural rigidity. Furthermore, it is still another objective of the present invention to provide a reinforced injection molded plastic panel which has an aesthetically pleasing interior and exterior panel surface, while maintaining the structural rigidity of the plastic panel.

The present invention provides a structurally reinforced plastic panel formed by injection molding. The structural integrity of the plastic panel is provided by a structural reinforcement material, such as carbon fibers, which have been incorporated into the plastic panel. More specifically, the carbon fibers are formed to a plastic film, resulting in a reinforced component. The reinforced component is placed in the injection molding tool prior to injection of the plastic, typically a thermoplastic material. Throughout the injection molding process, the structural reinforcement material is integrated into the plastic molded panel, thereby resulting in a reinforced plastic panel.

Although the development of the reinforced plastic panel is primarily to provide a horizontal plastic surface which may be used as a roof assembly, this concept may also be applied and developed for alternative horizontal applications, such as hoods, deck lids and additional parts that may require reinforcement.

Further areas of applicability of the present invention will become apparent from the detailed description provided hereinafter. It should be understood however that the detailed description and specific examples while indicating preferred embodiments of the invention are intended for purposes of illustration only. Thus various changes and modifications within the spirit and scope of the invention will become apparent to those skilled in the art from this detailed description.

BRIEF DESCRIPTION OF THE DRAWINGS

FIG. 1 is a perspective view of a vehicle roof assembly;

FIG. 2 is an exploded elevational view of a two piece vehicle roof assembly;

DETAILED DESCRIPTION OF THE PREFERRED EMBODIMENTS

Figure 3:
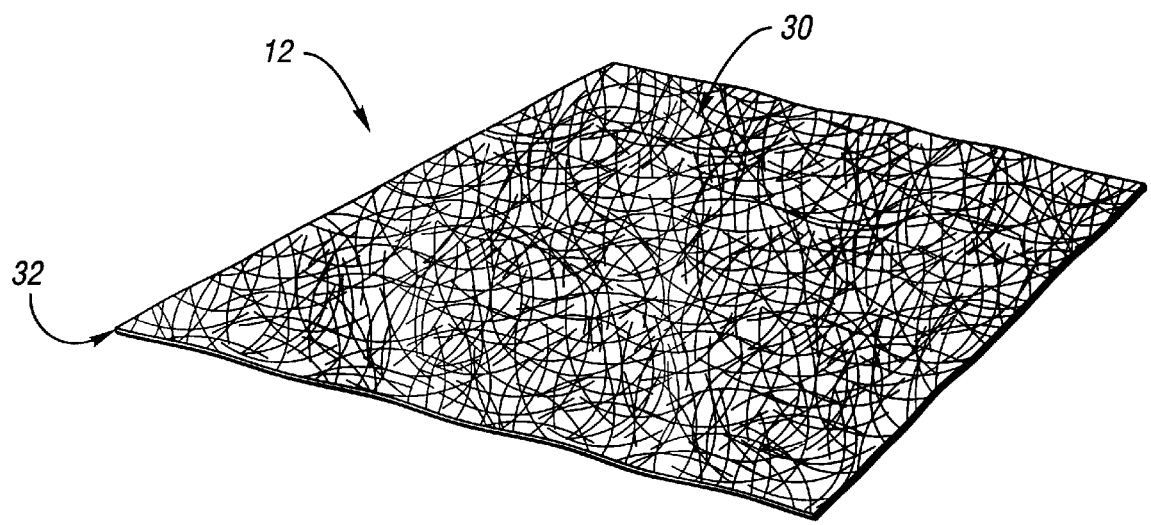
FIG. 3 is a perspective view of the reinforced component used to develop reinforced plastic panels.

Reference is first made to FIG. 1 which illustrates a particular embodiment of the present invention. More specifically, FIG. 1 depicts a horizontal vehicle body panel assembly 10 comprising a first plastic vehicle body panel 11 having a structurally reinforced area 12 and a second plastic vehicle body panel 15. The vehicle body panel assembly 10 is designed to be utilized as a roof panel of a motor vehicle, such as a hardtop cover.

The vehicle body panel assembly 10 includes an interior surface 14 and an exterior surface 16, as well as a front portion 18 and a rear portion 20. The exterior surface 16 of the panel assembly 10 is exposed to the outside environment of the motor vehicle, in contrast to the interior surface 14 which is facing the internal compartment 22 of the motor vehicle. Additionally, the front and rear portions 18 and 20 of the panel assembly 10 are designed to reflect the front and rear portions of the motor vehicle, respectively.

The structurally reinforced area 12 of the vehicle body panel 11 is designated by the cross-hatching within the middle section of the vehicle body panel 11. The structurally reinforced area 12 is provided by a reinforcing component 13. During production, the reinforcing component 13 is integrated into the injection molded plastic vehicle body panel 11. The reinforcing component 13 is not visible from the interior or exterior surfaces 14, 16 of the vehicle body panel assembly 10. The cross-hatching indicates the general vicinity of the structurally reinforced area 12 where the reinforcing component 13 has been incorporated into the panel.

The vehicle body panels 11 and 15 of the vehicle body panel assembly 10 are separately formed members as seen in the exploded view of FIG. 2, the vehicle body panels 11 and 15 each having an interior surface 14a, 14b and an exterior surface 16a, 16b, as well as a front 18a, 18b and rear portion 20a, 20b. The vehicle body panel 11 is located adjacent to the vehicle body panel 15, whereby upon placing the vehicle body panel 11 on the vehicle body panel 15, the interior surface 14a of the vehicle body panel 11 rests upon the exterior surface 16b of the vehicle body panel 15. The two vehicle body panels 11 and 15 are connected together to form the vehicle body panel assembly 10 as is reflected in FIG. 1. As previously mentioned, the structurally reinforced area 12 is indicated by cross-hatching and is provided by the reinforcing component 13 which is located on the vehicle body panel 11 of the horizontal vehicle panel assembly 10. This particular configuration provides structural integrity to the vehicle body panel 11 of the assembled vehicle body panel assembly 10 and prevents the vehicle body panel 11 of the assembled vehicle body panel assembly 10 from sagging through the two openings 28a, 28b located in the vehicle body panel 15 of the vehicle body panel assembly 10.

FIG. 3 is an illustrative drawing of the reinforcing component 13 used in producing the injection molded vehicle body panel 11. The reinforcing component 13 is comprised of a structural fiber material 30 and an opaque film 32. The structural fiber material 30 may consist of a multiplicity of fibers such as carbon fibers, glass fibers, metal wire fibers, or a screen-like material. Furthermore, the structural fiber material 30 may be in the form of a sheet-like arrangement or a loose fiber configuration.

Initially, the structural fiber material 30, carbon fiber in this particular embodiment, is placed on the inside surface of an opaque thermoplastic film. This thermoplastic film material is comprised of a material similar or identical to that used in the injection molding process. As can be seen in FIG. 3, the structural fiber material 3 is incorporated into the opaque film 32, resulting in the fiber 30 integrated on one side of the opaque film 32 and leaving a smooth surface on the other side of the film. A variety of techniques, known in the art, may be used to integrate the structural reinforcement material with the thermoplastic film. One technique for incorporating the structural fiber material is to vacuum form one carbon fiber and the opaque film together although additional techniques known in the art may be used. The reinforcing component 13 is typically manufactured previous to the injection molding process. The component may be obtained either in a prefabricated form or may be manufactured at the production facility of the injection molded plastic panels.

Figure 4:
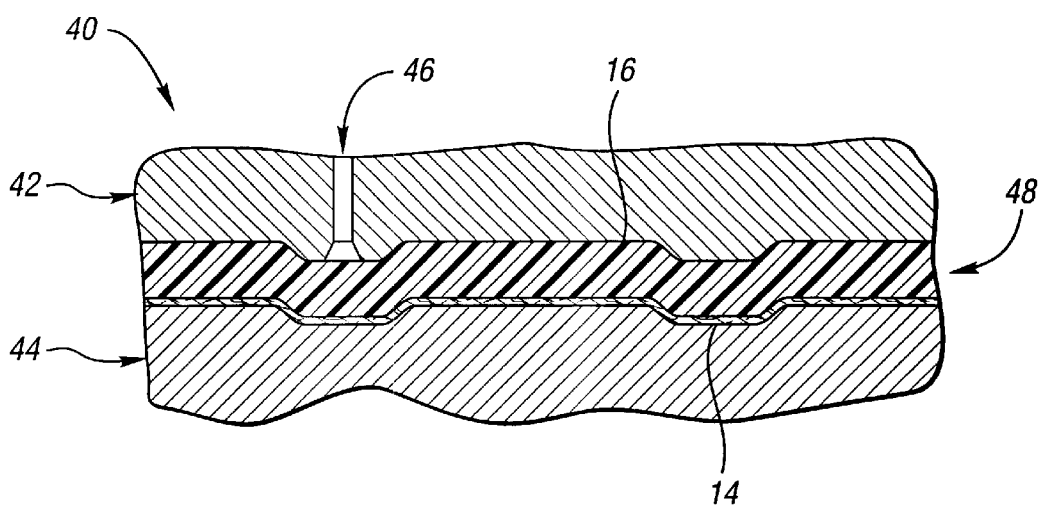
FIG. 4 is a cross-sectional view of the injection molding tool used to produce the structurally reinforced plastic panel.

The process and tool used to produce the structurally reinforced injection molded plastic panel will now be disclosed. Referring to FIG. 4, a cross-sectional view of the injection molding tool is provided, indicating the space provided for the injection molded plastic and reinforced area. To further understand the injection molding process, FIG. 5 provides a flow chart which follows the injection molding process from the initial formation of the structurally reinforced material to the final production of a structurally reinforced injection molded plastic panel.

The basis of the injection molding process is the design and operation of the injection molding tool. The injection molding tool 40 is comprised of a top portion 42 and a bottom portion 44. The top portion 42 of the injection molding tool 40 provides the exterior surface 16a of the vehicle body panel 11 of the horizontal vehicle body panel assembly 10. In contrast, the bottom portion 44 of the injection molding tool 40 provides the interior surface 14a of the vehicle body panel 11 of the horizontal vehicle body panel assembly 10. This particular surface designation is due to the development of the tool 40 and may be reversed or altered based on the desired performance and/or appearance of the molded plastics. The injection molding tool 40 is further designed to have a textured or grain surface on the mold. Therefore, the resulting plastic part produced from that mold will have a complimentary textured or grained show surface. By graining the mold surface the resultant surface of the injection molded panel will have a suitable appearance.

In addition to a top 42 and bottom portion 44 of the injection molding tool 40, multiple external surface gates 46 (only one is shown), are located within the top portion 42 of the injection molded tool 40. The external surface gate 46 provides a means of injecting the thermoplastic material into a mold space 48 located between the top and bottom portions 42, 44 of the injection molded tool 40. The basic principle behind injection molding is that a thermoplastic material is heated and then forced under pressure into the mold space of the injection molding tool. Once the plastic material is forced under pressure into the mold space of the mold, the plastic part ultimately takes the form of the mold space. Most injection molding tools are made of steel or aluminum in order to provide the necessary heat transfer characteristics. The injection molding process and tool are well known in the art and are used throughout industry to produce many different products.

Figure 5:
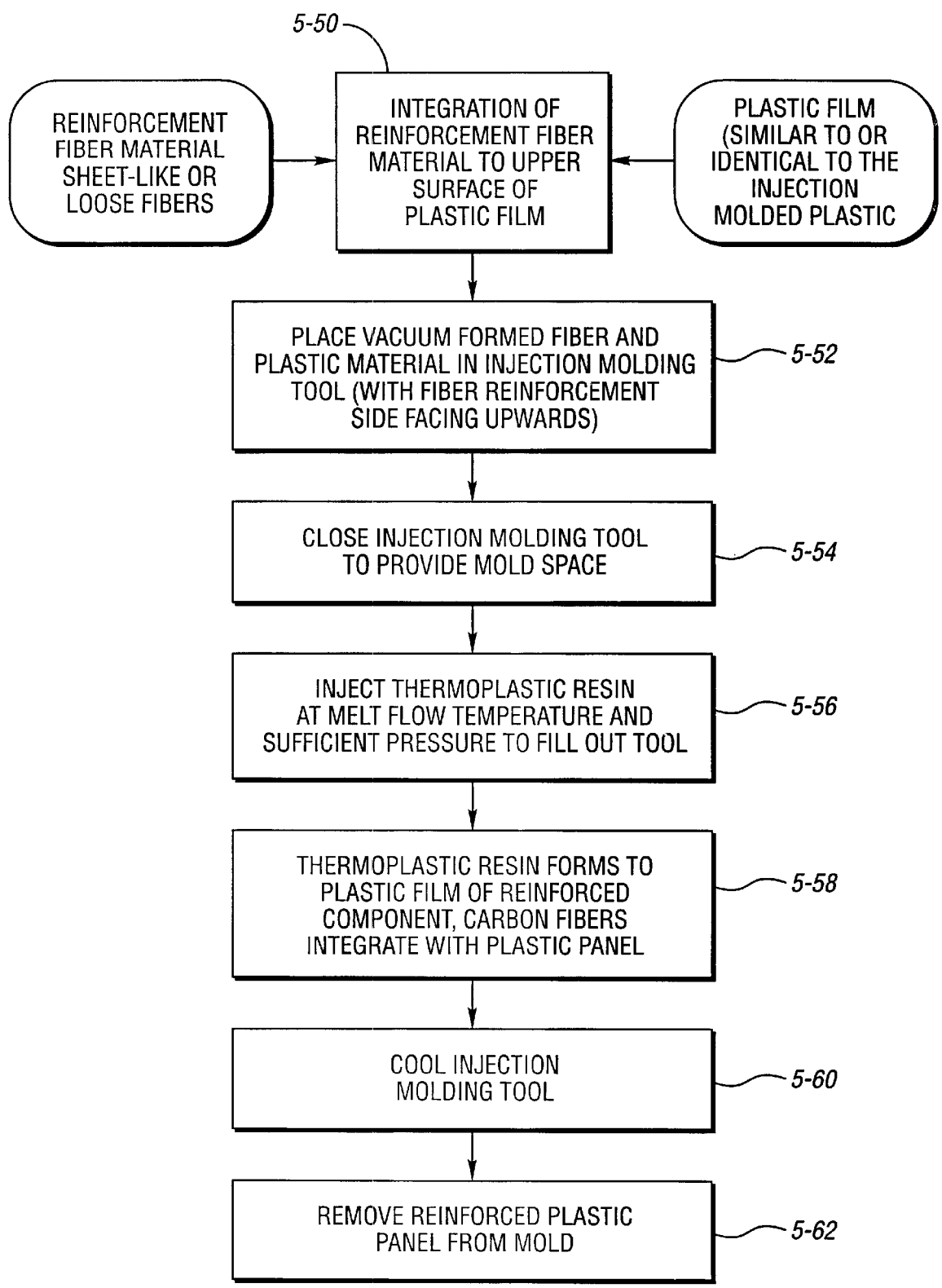
FIG. 5 is a process flow chart of the injection molding process to produce a reinforced plastic panel.

Although variations in the injection molding process are possible, the general process steps remain the same as seen in FIG. 5. In order to obtain a reinforced injection molded plastic panel it is first necessary to prepare the reinforced component (S-50), which is accompanied by vacuum forming a plastic film with the structural fiber reinforcement material. This may be done at the production site or may be obtained already prefabricated. The vacuum formed plastic film which has the carbon fibers randomly placed on the back surface is made of a thermoplastic material. Most preferably this thermal plastic material is polypropylene although alternative thermoplastic resins may be used. Following the production of the plastic film having the fiber structure reinforcement, the film is placed within the mold space 48, the injection molding tool 40 (S-52). The plastic film is situated within the injection tool in such a manner that the plastic film is placed against the bottom portion of the injection molding tool, thereby exposing the fibers to the injection molding thermoplastic.

In order to produce a reinforced injection molded plastic panel it is necessary to integrate the plastic film having the reinforced fiber material into or with the injection molded plastic. Following the placement of the plastic film having the carbon fibers into the injection molding tool (S-52), the injection molding tool is closed thereby providing an injection mold space (S-54). The mold space 48 allows for the thermoplastic material to be injected into the tool and formed within the injection mold space 48, thereby reflecting the surfaces of the injection molding tool. The thermoplastic resin is injected through the external surface gates 46 at a melt flow temperature and at a pressure sufficient to fill out the injection molding tool (S-56). Due to the combination of the temperature and pressure, the injection molded plastic forms to the plastic film of the reinforced component, allowing the carbon fibers to be integrated into the injection molding plastic panel (S-58). The structural reinforcement material is not visible on the exterior or interior surface of the plastic panel but is integrated into the plastic panel to improve structural integrity. Following the cooling of the injection molding tool (S-60), the structurally reinforced panel may be removed from the tool (S-62).

This particular embodiment and preparation of a thermoplastic reinforced horizontal panel may be used throughout the automotive industry in a variety of applications. Reinforced thermoplastic horizontal body surfaces will provide the industry with the ability to produce multiple configurations of horizontal panels while minimizing the cost of producing such panels.

The invention being thus described it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. A structurally reinforced vehicle body panel assembly comprising:

a first plastic vehicle body panel, a separately formed second plastic vehicle body panel connected to said first plastic vehicle body panel, and a reinforcing component molded in said first plastic vehicle body panel, said reinforcing component comprising a structural fiber material and a plastic film, and said structural fiber material being in sheet form and including a multiplicity of fibers.

2. A vehicle body panel assembly according to claim 1, wherein said fibers include carbon fibers.

3. A vehicle body panel assembly according to claim 1, wherein said fibers include glass fibers.

4. A vehicle body panel assembly according to claim 1, wherein said fibers include metal wire fibers.

* * * * *